United States Patent
Karthikeyan et al.

(10) Patent No.: US 10,798,008 B2
(45) Date of Patent: Oct. 6, 2020

(54) COMMUNICATIONS NETWORK

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

(21) Appl. No.: 15/740,832

(22) PCT Filed: Jun. 30, 2016

(86) PCT No.: PCT/EP2016/065429
§ 371 (c)(1),
(2) Date: Dec. 29, 2017

(87) PCT Pub. No.: WO2017/001628
PCT Pub. Date: Jan. 5, 2017

(65) Prior Publication Data
US 2018/0191621 A1    Jul. 5, 2018

(30) Foreign Application Priority Data
Jun. 30, 2015    (EP) .................................... 15275166

(51) Int. Cl.
*H04L 12/851*    (2013.01)
*H04L 12/725*    (2013.01)
(Continued)

(52) U.S. Cl.
CPC ...... *H04L 47/2425* (2013.01); *H04L 41/5009* (2013.01); *H04L 41/5025* (2013.01);
(Continued)

(58) Field of Classification Search
CPC .................................................. H04L 47/2425
See application file for complete search history.

(56) References Cited

U.S. PATENT DOCUMENTS 6,631,135 B1    10/2003    Wojcik
6,690,929 B1    2/2004    Yeh
(Continued)

FOREIGN PATENT DOCUMENTS

EP    1 016 261    7/2000
EP    1 374 486    1/2004
(Continued)

OTHER PUBLICATIONS

Extended European Search Report dated Nov. 26, 2015 issued in European Application No. 15275166.5 (5 pgs.).
(Continued)

*Primary Examiner* — Kevin M Cunningham
(74) *Attorney, Agent, or Firm* — Nixon & Vanderhye P.C.

(57) ABSTRACT

The present invention provides a method of operating a communications network such that the classes of service offered by a network operator will depend upon the underlying conditions in the network. A number of performance models, each of which is described by two vectors, is determined from historical network data. These performance models can be assigned to routes through the communications network, such that a request for a session can be made in accordance with the offered performance model for that route.

12 Claims, 1 Drawing Sheet

(51) Int. Cl.
*H04L 12/927* (2013.01)
*H04L 12/24* (2006.01)
H04L 12/26 (2006.01)
H04L 12/911 (2013.01)
H04L 29/06 (2006.01)

(52) U.S. Cl.
CPC ............ *H04L 45/302* (2013.01); *H04L 47/24* (2013.01); *H04L 47/805* (2013.01); *H04L 43/0876* (2013.01); *H04L 47/726* (2013.01); *H04L 65/80* (2013.01)

(56) References Cited

U.S. PATENT DOCUMENTS

| | | | |
|---|---|---|---|
| 7,668,946 | B1 | 2/2010 | Garcia-Franco et al. |
| 7,715,312 | B2 | 5/2010 | Khasnabishi |
| 8,073,455 | B1 | 12/2011 | Xie et al. |
| 2001/0013067 | A1 | 8/2001 | Koyanagi et al. |
| 2003/0112762 | A1 | 6/2003 | Hasan Mahmoud et al. |
| 2004/0120705 | A1 | 6/2004 | Friskney et al. |
| 2005/0083849 | A1 | 4/2005 | Rui et al. |
| 2005/0102414 | A1 | 5/2005 | Hares et al. |
| 2006/0187817 | A1 | 8/2006 | Charzinski et al. |
| 2007/0230363 | A1 | 10/2007 | Buskens et al. |
| 2007/0268827 | A1 | 11/2007 | Csaszar |
| 2008/0065318 | A1 | 3/2008 | Ho |
| 2008/0232247 | A1 | 9/2008 | Evans |
| 2010/0214920 | A1 | 8/2010 | Tewani et al. |
| 2010/0265826 | A1 | 10/2010 | Khasnabishi |
| 2011/0087522 | A1 | 4/2011 | Beaty et al. |
| 2013/0144550 | A1 | 6/2013 | Czompo |
| 2013/0275567 | A1 | 10/2013 | Karthikeyan et al. |
| 2013/0275589 | A1 | 10/2013 | Karthikeyan et al. |
| 2013/0311673 | A1 | 11/2013 | Karthikeyan |
| 2014/0046880 | A1* | 2/2014 | Breckenridge ...... G06N 99/005 706/12 |
| 2014/0052850 | A1 | 2/2014 | Doorhy et al. |
| 2015/0074283 | A1 | 3/2015 | Karthikeyan et al. |
| 2015/0098338 | A1 | 5/2015 | Bhattacharya |
| 2015/0332155 | A1* | 11/2015 | Mermoud ............... G06N 5/048 706/12 |
| 2015/0381648 | A1* | 12/2015 | Mathis .................. H04L 41/145 726/22 |
| 2016/0171398 | A1* | 6/2016 | Eder ...................... G06Q 10/06 705/7.28 |
| 2016/0344604 | A1 | 11/2016 | Raleigh |
| 2018/0191606 | A1 | 7/2018 | Karthikeyan |
| 2018/0191621 | A1 | 7/2018 | Karthikeyan |
| 2018/0191635 | A1 | 7/2018 | Karthikeyan |

FOREIGN PATENT DOCUMENTS

| | | | |
|---|---|---|---|
| EP | 1 401 161 | A2 | 3/2004 |
| EP | 1 993 231 | A1 | 11/2008 |
| EP | 2 151 951 | A2 | 2/2010 |
| EP | 2 261 811 | | 12/2010 |
| EP | 2 469 756 | | 6/2012 |
| EP | 1 875 693 | | 8/2012 |
| WO | 99/14931 | | 3/1999 |
| WO | 02/080458 | A1 | 10/2002 |
| WO | 2006/116308 | A2 | 11/2006 |
| WO | 2011/076282 | | 6/2011 |
| WO | 2012/085520 | A1 | 6/2012 |
| WO | 2012/085521 | A1 | 6/2012 |
| WO | 2013/144550 | | 10/2013 |
| WO | 2014/068268 | | 5/2014 |
| WO | 2014/068270 | A1 | 5/2014 |
| WO | WO 2014/068268 | | 5/2014 |
| WO | 2017/001628 | | 1/2017 |
| WO | 2017/001629 | | 1/2017 |

OTHER PUBLICATIONS

International Search Report and Written Opinion of the International Searching Authority dated Sep. 5, 2016 issued in International Application No. PCT/EP2016/065429 (16 pgs.).
Tanja Zseby and Sebastian Zander, "Sampling Schemes for Validating Service Level Agreements", Centre for Advanced Internet Architectures, CAIA Technical Report 040706A, Jul. 2004 (6 pgs.).
Krishna Kumar Balaraman, "Application of Data Mining in the Telecommunication Industry", Term Paper, Indian Institute of Management Bangalore, Oct. 22, 2011 (23 pgs.).
Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pgs.).
International Search Report of PCT/EP2016/065429, dated Sep. 5, 2016, 4 pages.
Search Report dated Apr. 27, 2016 issued in GB1517110.1 (7 pages).
International Search Report and Written Opinion of the International Searching Authority dated Sep. 23, 2016, issued in International Application No. PCT/EP2016/065431 (13 pages).
U.S. Appl. No. 15/740,837, filed Dec. 29, 2017 (33 pgs.).
Examination Report issued in EP Application No. 16 733 597.5 dated Sep. 12, 2019 (9 pages).
Ananya DAS "Maximizing Profit Using SLA-Aware Provisioning", 2012 IEEE Network Operations and Management Symposium (NOMS), Math & Computer Science Department, Lake Forest College, Apr. 16, 2012 (8 pages).
International Search Report of PCT/EP2016/065431, dated Sep. 23, 2016, 3 pages.
U.S. Appl. No. 15/740,520, filed Dec. 28, 2017 (30 pgs.).
U.S. Appl. No. 15/740,837, filed Dec. 29, 2017 (31 pgs.).
International Search Report and Written Opinion issued in PCT/EP2016/065434 dated Oct. 6, 2016 (15 pages).
Valikannu "A Novel Energy Consumption Model using Residual Energy Based Mobile Agent Selection Scheme (REMA) in MANETs" 2015 $2^{nd}$ International Conference on Signal Processing and Integrated Networks (SPIN), Noida, India. Pub., IEEE, Feb. 19-20, 2015 (6 pages).
GB Search Report issued in GB1517349.5, dated May 26, 2016 (6 pages).
Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
Office Action dated Oct. 17, 2018 issued in U.S. Appl. No. 15/740,837 (11 pgs.).
Office Action dated Apr. 19, 2019 issued in U.S. Appl. No. 15/740,837 (14 pgs.).
Advisory Action dated Aug. 2, 2019 issued in U.S. Appl. No. 15/740,837 (4 pgs.).
Office Action dated Nov. 2, 2018 issued in U.S. Appl. No. 15/740,520 (13 pgs.).
Office Action dated May 30, 2019 issued in U.S. Appl. No. 15/740,520 (16 pgs.).
Office Action dated Nov. 13, 2019 issued in U.S. Appl. No. 15/740,837 (11 pgs.).
Advisory Action dated Oct. 8, 2019, issued in Application No. 15/740,520 (3 pages).
Office Action dated Mar. 4, 2020 issued in U.S. Appl. No. 15/740,520 (19 pgs.).

\* cited by examiner

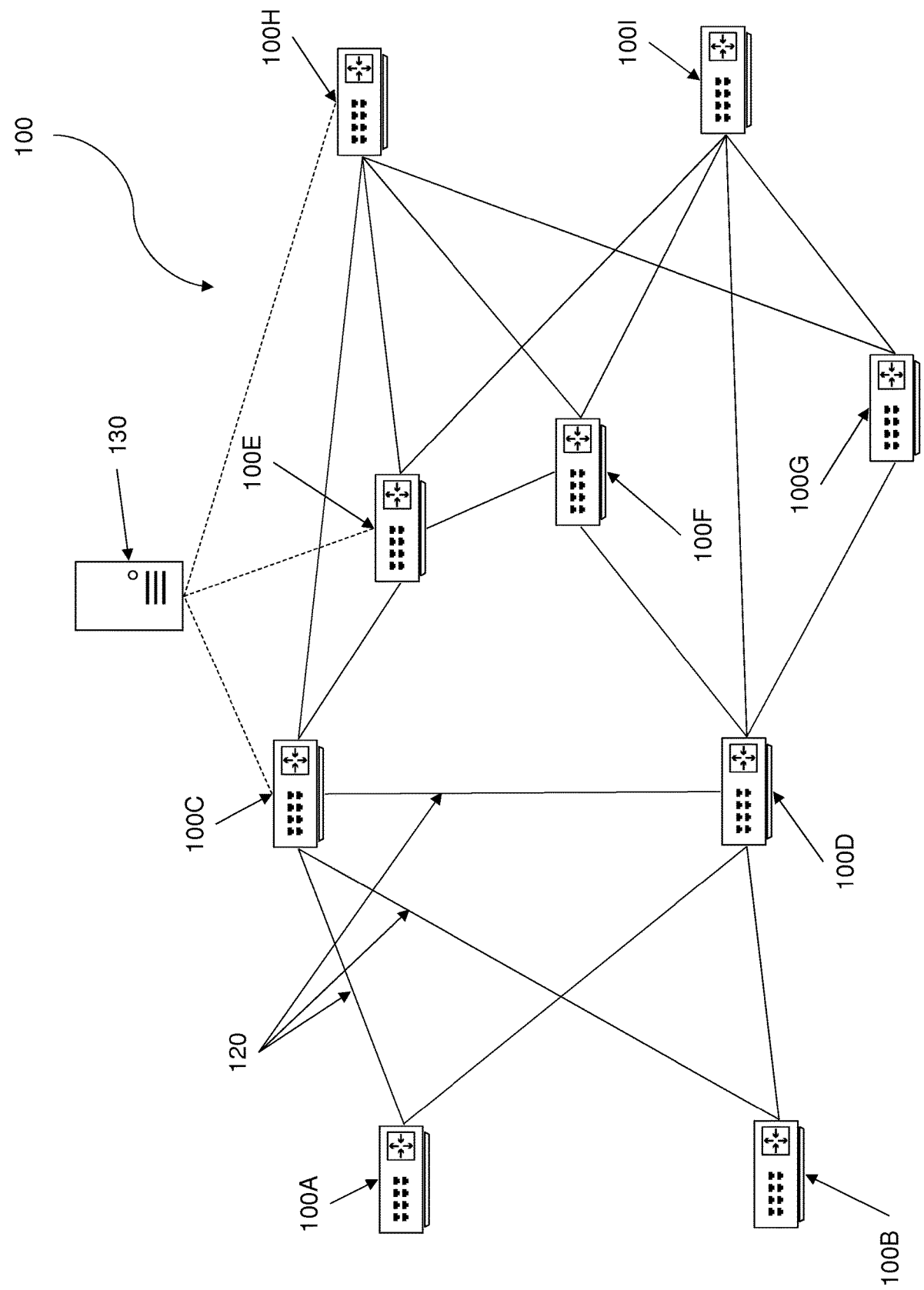

COMMUNICATIONS NETWORK

This application is the U.S. national phase of International Application No. PCT/EP2016/065429 filed Jun. 30, 2016, which designated the U.S. and claims priority to EP Patent Application No. 15275166.5 filed Jun. 30, 2015, the entire contents of each of which are hereby incorporated by reference.

BACKGROUND AND SUMMARY

There are two main ways for network operators to provide granular performance guarantees: Integrated Services (IntServ) and Differentiated Services (DiffServ). Whilst IntServ has suffered from scalability challenges, DiffServ has become popular. Within the DiffServ framework, operators choose to provide various Classes of Service (CoS) such as Expedited Forwarding (EF), Assured Forwarding (AF) and Best Effort (DE) delivery, each of which corresponds to different Quality of Service (QoS) promises. For example, an operator can choose to offer within a single country 20 ms of round trip delay, 99.9% packet delivery rate and a jitter of 2 ms for a CoS like EF. Consumers, i.e. service providers that deliver data over the networks, purchase a specified throughput through the network in advance with pre-defined characteristics for which they expect pre-agreed Service Level Agreements (SLAs). Performance is monitored on the network and should performance drop below the promised targets, the network operator might have to compensate for this breach using a credit system or similar. The data packets that enter the network from the client (either a single client or a group of clients) are marked with the appropriate CoS in the traffic in the Type of Service (ToS) field or in the Differentiated Services Code Point (DSCP) field by the client themselves or an edge device managed by the operator.

The applicant's co-pending international patent application WO2014/068268 discloses a method in services are re-mapped to a different class of service based on predictive analytics on network performance for all the available classes of service. However, this proposal still adhered to the 5 major classes of services (EF, AF1, AF2, AF3, DE) for re-mapping. In the ensuing discussion the conventional EF/AFx/DE DiffServ model will be referred to as classic DiffServ to distinguish its behaviour from the adaptive QoS model of the present application.

According to a first aspect of the present invention there is provided a method of operating a communications network, the method comprising the steps of: determining a plurality of performance models, each of the performance models comprising a first vector representing the average value of one or more transmission parameters and a second vector representing the variation of the average value of the one or more transmission parameters; for each entry in a training dataset, assigning one of the plurality of performance models to that entry, the training dataset comprising data relating to a plurality of data transmissions that were carried by the communications network in a predetermined time period; for each one of a plurality of routes through the communications network, assigning one or more of the plurality of performance models to that route; and accepting a request for a communication session using the communications network in accordance with the one or more performance models assigned to one or more of the plurality of routes through the communications network.

According to a second aspect of the present invention there is provided a data carrier device comprising computer executable code for performing a method as described above.

According to a third aspect of the present invention there is provided an apparatus configured to, in use, perform a method as described above.

According to a fourth aspect of the present invention there is provided a communications network comprising a plurality of nodes, a plurality of communications links interconnecting the plurality of nodes, and a network gateway, the communications network being configured to, in use, perform a method as described above.

BRIEF DESCRIPTION OF THE DRAWINGS

FIG. 1 shows a schematic depiction of a communications network according to an embodiment of the present invention.

DETAIL DESCRIPTION OF PRESENT EXAMPLE EMBODIMENTS

FIG. 1 shows a communications network 100 comprising a plurality of routers 100A, 100B, 100C, . . . , 100I according to an embodiment of the present invention. Communications links 120 provide interconnections between a first router and a second router. It will be understood that each of the plurality of routers are not connected to all of the other routers which comprise the network. FIG. 1 shows that routers 100A and 100B form a first edge of the network, Similarly, routers 100H and 100I form a second edge of the network. These routers may be referred to as edge routers. Requests to establish a session through the network, such that data might be transmitted across the network, may be received at the edge routers at the first edge or the second edge of the network. The routers 100C, 100D, 100E, 100F & 100G will receive data which has originated from a first edge router and which is destined to the be routed to a second edge router. These routers may be referred to as core routers. The network further comprises a network gateway 130 which manages the performance of the routers and accepts, or rejects, requests to admit sessions to the network. More specifically, the network gateway learns performance models from historic traffic data carried over the communications network, assigns performance models to routes through the network and monitors and manages performance models throughout their life cycle.

FIG. 1 shows a schematic depiction of a communications network 100 according to an embodiment of the present invention. The communications network 100 comprises a plurality of routers 100A, 100B, 100C, . . . , 100I. Communications links 120 provide interconnections between a first router and a second router. It will be understood that each of the plurality of routers are not connected to all of the other routers which comprise the network. FIG. 1 shows that routers 100A and 100B form a first edge of the network, Similarly, routers 100H and 100I form a second edge of the network. These routers may be referred to as edge routers. Requests to establish a session through the network, such that data might be transmitted across the network, may be received at the edge routers at the first edge or the second edge of the network. The routers 100C, 100D, 100E, 100F & 100G will receive data which has originated from a first edge router and which is destined to the be routed to a second edge router. These routers may be referred to as core routers. The network further comprises a network gateway 130 which manages the performance of the routers and accepts, or rejects, requests to admit sessions to the network. More specifically, the network gateway learns performance models from historic traffic data carried over the communications network, assigns performance models to routes through the network and monitors and manages performance models throughout their life cycle.

In one example, a performance model may comprise a three-dimensional performance-based model comprising of jitter J, loss L and delay D. Each performance model $P_i$ can be characterised by a prototype vector $$p_i = (\bar{j}_i, \bar{l}_i, \bar{d}_i) \quad [1]$$

and a 99% confidence interval vector $$c_i = (cj_i, cl_i, cd_i) \quad [2]$$

The prototype vector $p_i$ specifies the typical or average performance of the parameters which comprise the model and the confidence vector $c_i$ specifies the 99% confidence interval p±c for each component p of $p_i$ (it will be understood that other confidence intervals or other determinations of parameter variability may be used). The advantage of this representation over an interval based representation is that we can easily determine the distance of the current performance of a transmission to any performance model. We can also evaluate the consistency or value of a performance model, i.e. smaller confidence intervals indicate that we will see less deviation from the desired performance.

Instead of a confidence interval, we can also use a quantile, e.g. the 99% percentile. This will indicate that 99% of the measured performance values will be within a certain threshold, i.e. p<c for 99% of all values. This may be sufficient for a client who wants to know what the worst case performance of the transmission could be, but it is less useful for an operator who may want to define performance intervals that are clearly separated from each other.

Instead of directly exposing the vector $c_i$ to clients the operator can also choose to use a different type of interval or threshold around the prototype, for example a deviation of less than x % per component and publish that to clients. The confidence vector is then only used internally by the network in order to decide if a prototype is stable enough to constitute a performance model.

Performance models may be identified by means of cluster analysis applied to transmission performance data which has been obtained from the end to end traffic that has been admitted into the network. Each transmission $T_k$ may be represented by a vector $t_k = (j_k, l_k, d_k)$ specifying the average jitter, loss and delay (for example) observed over the period of the transmission (it will be understood that the traffic performance may be characterised using other metrics in addition to, or as alternative to, jitter, loss and delay). Cluster analysis will discover the natural groupings in the traffic and learn a number of model prototype vectors $p_i$. The 99% confidence interval p±c for a component p of a prototype vector p is computed by $$c = \frac{2.58}{\sqrt{n}} S \quad [3]$$

where s is the standard deviation of the sample used to compute the prototype component and n is the sample size. We assume that a prototype vector is the component-wise arithmetical mean of all sample vectors assigned to a cluster by the clustering algorithm, which is the case for centroid-based clustering algorithms using the Euclidean distance.

The computation of the 99% confidence interval for each component uses the fact that sample means are normally distributed and that the standard deviation of their distribution can be estimated by dividing the standard distribution of the data sample by √n (where n is the sample size). For a normal distribution 99% of the data is covered by an interval extending 2.58 times to either side of the mean. We are using the 99% confidence interval of the sample mean as an estimate for the reliability of a performance model. The network operator can set thresholds in relation to the model prototypes which represent the average performance of a data transmission according to a model. For example, if a component of a confidence vector is larger than 10% of the equivalent component of a model prototype vector, the model can be deemed unreliable because the expected variation of from the mean is considered to be too large.

In addition to identifying prototypes through cluster analysis it is also possible to define pre-determined prototype models which represent default QoS models that the network operator wishes to offer to its clients. For these prototypes, it is only necessary to compute confidence vectors and these vectors are not then changed using cluster analysis.

Once the performance models have been identified through clustering or by pre-determination, we label each entry in the training database with the closest performance model (or a number of closest performance models in the case when using a fuzzy clustering approach). In the next step we identify which routes through the network are associated with which performance model and how close the traffic on each route matches the associated performance models. By using the labelled entries in the training database we assign a list of performance models to each route R by using the following criteria for each performance model $P_i$.
1) Sufficient Evidence: Were there at least $t_{min}$>0 transmissions on R that have been mapped to $P_i$? (this threshold $t_{min}$ is set by the network operator)
2) Sufficient Quality: Is the confidence vector $c_i$ computed from the transmissions on R mapped to $P_i$ good enough, i.e. are the components of $c_i$ smaller than a threshold specified by the network operator?

After this assignment has been completed, we have obtained a list of performance models and their qualities for each route through the network. It is possible that there will be routes with no assigned performance models. This can happen because there is not enough traffic on a route and therefore insufficient evidence to be able to assign a model to the route. It is also possible that the traffic on a route is so diverse that it does not match any performance model sufficiently closely so any model mapped to the route would not provide adequate quality. The network operator would not be able to make any QoS guarantees for such routes determined in this manner. The QoS guarantees for such routes could follow conventional approaches such as classic DiffServ QoS models. Alternatively, the operator could decide to compute a bespoke model $P_R$ that represents the average QoS conditions on this route R and offer guarantees according to the confidence vector $c_R$ for this model. In this case $p_R$ would not be obtained through clustering but simply by averaging the vectors $t_k^{(R)}$ for the transmissions on R.

After performance models have been assigned to routes through the network, the available bandwidth for each route and each performance model can then be determined. This can be done by computing the amount of traffic that has flown over each route in the past and how it was distributed over each of the assigned models. Alternatively, the network may maintain a single capacity per route and manage capacity across models instead of per model.

The network gateway 130 re-runs this algorithm in regular intervals set by the network operator, e.g. every hour. In between the re-runs the network gateway collects traffic data and adds it to the training database. Old entries in the training database are removed (or alternatively marked as being invalid and then removed after a period of remaining invalid) after a period of time to make sure that the algorithm does not use outdated information. After each re-run the network gateway compares the new performance models to the current performance models and updates the model database. If a new model is very similar to a previous model the network gateway may decide to retain the old model instead. The similarity is based on the Euclidean distance between the model prototype vectors and the operator will set a threshold for an acceptable distance for which two prototype vectors would be considered similar enough to represent the same model. This procedure avoids rapid changes in advertised models if the performance differences would not be significant The network gateway stores all models in a model database M and in a Model-Route mapping Table MR. The model gateway also collects and updates statistics for all models and routes by monitoring all traffic that traverses the network mapped to any performance model in regular intervals as defined by the operator, for example every 10 minutes. All traffic flows are counted for each performance model and capacity is then calculated for each model. This is done for each model overall in M and per model and route in MR. The values in MR are used for the decision if a flow can be admitted on a route R using a particular performance model. The bandwidth available to a model on a particular route and the confidence vector of a model will be regularly updated based on traffic monitoring and predictive values can be computed based on historic data and a predictive model, for example, linear regression or a neural network (M Berthold & D J Hand, "*Intelligent Data Analysis*", Springer, Berlin, 1999)

The training data table T contains entries representing the QoS of all end-to-end data transmissions within a given time period. The operator configures for how long historic traffic flows remain in T and the duration should reflect an expected period of stability for the network where the operator does not expect routes or traffic patterns to change substantially. If the operator wishes to build a time-dependent predictive model for the reliability and capacity of models then the duration should reflect this, for example 24 hours or 1 week: the following discussion assumes a duration of 24 hours.

A traffic flow is entered into T as soon as it enters the network. The statistics of a flow are updated when the flow ends or on a periodic basis, for example every 20 minutes. Flows that last longer than the update period will be entered into the training table T again such that T contains a representation of all statistical features of a flow over time. Rows 1 and 4 in Table 1 below illustrate this. A flow on route 1 started at time 13.00 and completed at time 13.38 leads to the creation of two rows of statistics in T. If a flow has entered the network using a particular performance model this is also recorded in T.

TABLE 1

| Extract from the training data table T at 14:00 on 20 Mar. 2014 | | | | | | | | |
|---|---|---|---|---|---|---|---|---|
| ID | Route | $t_s$ | $t_e$ | Throughput (Mbps) | Jitter (ms) | Loss (%) | Delay (ms) | Model |
| 1 | 1 | 13.00 | 13.20 | 9.88 | 3.053416 | 0.148704 | 24.72323 | 1 |
| 2 | 2 | 13.05 | 13.15 | 10.18 | 3.030675 | 0.150843 | 25.04373 | 1 |
| 3 | 3 | 13.00 | 13.20 | 9.81 | 2.955859 | 0.15138 | 24.61943 | 1 |
| 4 | 1 | 13.20 | 13.38 | 9.84 | 2.989925 | 0.151806 | 24.64379 | 1 |
| ... | ... | ... | ... | ... | ... | ... | ... | ... |

The model database M contains an entry for each model that has been discovered by the learning algorithm. The network gateway uses the model database M to decide how long a model will be kept active for and whether new models should be accepted into M. The network gateway records all global statistics for each model in M, i.e. statistics across the whole network. The confidence vector and the number of flows (cluster support) indicate how reliable and how well supported by traffic a model is, respectively. When a new model has been identified it is compared against all entries in M and if the distance to any prototype is smaller than the operator defined threshold the new model is discarded.

The number of traffic flows that were assigned to the model and their accumulated bandwidth can be used as indicators when a model is no longer used and should be retired. In the same manner the confidence vector can be used to decide if the reliability of a model is no longer sufficient and that it should be removed.

TABLE 2

Extract from the Model Database M at 14:00 on 20 Mar. 2015

| | Base Data | | | Capacity | Global Statistics | | | | |
|---|---|---|---|---|---|---|---|---|---|
| ID | Prototype | Confidence | Created | [Mb/s] | Routes | Peak Flows | Peak Demand [Mb/s] | 1 hr Flows | ... |
| 1 | (3.1, 0.1521, 25.15) | (0.0280, 0.0015, 0.2193) | 20 Mar. 2014 12:00 | 200 | 3 | 24 | 153 | 13 | ... |
| 2 | (4.00, 0.1003, 29.76) | (0.0395, 0.0008, 0.2235) | 20 Mar. 2014 14:00 | 150 | 3 | 0 | 0 | 0 | ... |
| 3 | (2.50, 0.1995, 19.90) | (0.0211, 0.0017, 0.1905) | 20 Mar. 2014 14:00 | 300 | 3 | 0 | 0 | 0 | ... |
| ... | ... | ... | ... | | ... | ... | ... | ... | ... |

The model-route mapping table MR lists all routes with all models assigned to them. The statistics in the model-route mapping table are the same as those in the model database, but they are computed on a per route basis. The model-route mapping table MR is used by the network gateway to decide which model can be offered on which route. A model that is not sufficiently reliable or which is not used regularly can be removed from the model-route mapping table. New models are inserted into the model-route mapping table once they have been inserted into the model database. Similarly, a model will be removed from the model-route mapping table when it is removed from the model database.

The repository of such advertisements can be held at a known location such as an edge router, a session admission unit, a bandwidth broker or at a network interface between a client site and the network itself.

A client will determine the closest match to their required SLA from one of the advertised QoS SLAs at a particular time and mark their packets in the IP layer according to the behaviour they would like from the network. This involves computing the similarity of requested QoS against offered QoS which can either be done by the client or by a translation device, for example the network gateway or another device managed by the network, aware of the client's QoS requirements on a per application or service

TABLE 3

Model-Route Mapping Table MR at 14:00 on 20 Mar. 2015

| | | Base Data | | Capacity | | Route-based Statistics | | |
|---|---|---|---|---|---|---|---|---|
| Route | Model ID | Route Confidence | Active since | [Mb/s] | Peak Flows | Peak Demand [Mb/s] | ... | |
| 1 | 1 | (0.0280, 0.0015, 0.2193) | 20 Mar. 2014 12:00 | 100 | 8 | 82 | | |
| 2 | 1 | (0.0280, 0.0015, 0.2193) | 20 Mar. 2014 12:00 | 50 | 9 | 48 | | |
| 3 | 1 | (0.0280, 0.0015, 0.2193) | 20 Mar. 2014 12:00 | 50 | 7 | 23 | | |
| 4 | 2 | (0.0395, 0.0008, 0.2235) | 20 Mar. 2014 14:00 | 200 | 0 | 0 | ... | |
| ... | ... | ... | ... | | ... | ... | ... | |
| 9 | 3 | (0.0211, 0.0017, 0.1905) | 20 Mar. 2014 14:00 | 100 | 0 | 0 | ... | |
| ... | ... | ... | ... | | ... | ... | ... | |

The network performance data can be analysed to determine one or more cluster centres. These can then be used as the basis for the QoS SLAs that are offered over the network. For example, if the cluster centre denotes a traffic SLA of {delay, jitter, loss}=(20 ms, 2 ms, 0.1%) with 4 routes having a performance profile that can support this for time T into the future, this SLA is advertised with a specific DSCP or ToS codepoint which can be used by traffic flows that wish to be delivered with this SLA.

type basis. Alternatively, acceptable boundaries of QoS can be pre-determined by the service provider on a service by service basis in by specifying a set of performance parameters for each application type, for example in the form of: application type, (minimum throughput required, lower jitter boundary, upper jitter boundary, lower delay boundary, upper delay boundary, lower RTT boundary, upper RTT boundary).

Alternatively, the above information could be represented as a percentage tolerance from the ideal QoS requirements. If such strict boundaries are not pre-defined, the network interface to the client may use a similarity function to determine the most appropriate QoS required for the specific service request.

It will also be noted that the learning algorithm uses both automatic cluster centre discovery as well as clustering around fixed cluster centres. The fixed cluster centres could correspond to conventional EF/AFx/DE QoS SLAs in order to provide backwards compatibility with clients that are unaware of the adaptive CoS system and would prefer to opt for model of pre-purchased throughput at a given SLA. It could be network policy that such routes that offer SLAs corresponding to the traditional DiffServ model retain these routes specifically for clients that request classic DiffServ. Alternatively, classic DiffServ can be perceived merely as further options for services to choose from in addition to the dynamic ones and opt for them if they so desire. Policies on filtering out specific QoS SLAs options to specific clients are left to the discretion of the operator.

The client may choose to define a local Forwarding Equivalence Class (FEC) that maps services onto QoS requirements and map the FEC onto the DSCP value that delivers this QoS requirement at that specific time of data transfer. Similar to the concept of FEC, the packets may not be of the same application or service or indeed have the same source/destination pair. Packets marked with the same DSCP value will be treated by the same way by the network. The client (or network interface entity), having decided what QoS is desired for a given service type at a specific time using this FEC-like mapping, marks the IP packets accordingly. This marking is then used by the network to route traffic as requested.

Unlike the conventional model of purchasing bandwidth in advance, the present method provides a more real-time 'shop window' style approach. Applications can now have time-variant QoS requirements and make use of the number of QoS SLA options offered. Clients can choose a different QoS SLA if a previously chosen SLA is no longer necessary. This might be the case when a client monitors end-to-end performance (e.g. arising from traffic traversing several network segments of which the present system offering dynamic CoS is one) and finds that they can opt for a lower CoS at a lower price if end-to-end performance is still satisfied across all the segments. The same applies to aggregates of traffic from a single large customer—different varieties of traffic are sent at different times of day and it might be more suitable to opt for a different CoS at different times, depending on the type of traffic being sent. Some applications might not be subject to stringent QoS SLAs but would require some QoS guarantee and can choose one of the available QoS options accordingly, trading off cost with performance in real-time and on a more granular basis. Pricing may be done in real-time based on usage rather than pre-determining what usage might look like and subsequently sending too much or too little traffic. This approach of demand management is similar to ordering groceries from a shop in real-time as the need arises, subject to current conditions, instead of periodically in advance and risking having too much left over or of running out.

Table 4 shows the data associated with 30 traffic flows across a plurality of routes through the network described above with reference to FIG. 1. The traffic flows across a plurality of routes were observed for a period of one hour. It will be understood that from the following discussion that the exact nature of the routing of the routes through the network is not relevant to the operation of the present invention and thus the different routes are not shown in FIG. 1.

The data can be used to compute the prototype vector and the confidence vector for a number of performance models. It is assumed that the network operator has configured the following parameters:

The clustering algorithm runs every hour

Statistical data for traffic streams is collected every 20 minutes

A model is considered to be reliable if the confidence vector shows deviations of less than 10% from the prototype.

A model is assigned to a route if there are at least 3 data samples per route within the global confidence interval of a model If a newly detected model is within 10% of an existing model, the new model is deemed to be identical to the existing model: the newly detected model is discarded and the old model is kept.

Only the traffic data for the last hour is kept in the training data table T.

The jitter, loss, and delay measurements of the traffic flows are show below in Table 4. The flows across routes 1-3 were using the existing model 1. The flows across routes 4-9 were not using any performance model. The application of cluster analysis to this data results in the detection of three clusters with 10 data samples assigned to each cluster (the cluster assignments are shown in the column titled "Cluster"). The centres of these three clusters are given in Table 5Table. They form the prototype vectors of three performance models. The confidence vectors are given by the 99% confidence intervals for the computed cluster centres. These vectors are shown in Table.

TABLE 4

Data table T - statistics for 30 traffic flows.

| ID | Route | $t_s$ | $t_e$ | B | Jitter | Loss | Delay | Model | Cluster |
|---|---|---|---|---|---|---|---|---|---|
| 1 | 1 | 13.00 | 13.20 | 9.88 | 3.05 | 0.1487 | 24.72 | 1 | 1 |
| 2 | 2 | 13.05 | 13.15 | 10.18 | 3.03 | 0.1508 | 25.04 | 1 | 1 |
| 3 | 3 | 13.00 | 13.20 | 9.81 | 2.96 | 0.1514 | 24.62 | 1 | 1 |
| 4 | 1 | 13.20 | 13.38 | 9.84 | 2.99 | 0.1518 | 24.64 | 1 | 1 |
| 5 | 2 | 13.24 | 13.40 | 10.04 | 3.03 | 0.1521 | 24.87 | 1 | 1 |
| 6 | 3 | 13.20 | 13.40 | 9.98 | 3.01 | 0.1523 | 24.84 | 1 | 1 |
| 7 | 1 | 13.46 | 14.00 | 9.99 | 2.97 | 0.1530 | 24.60 | 1 | 1 |
| 8 | 2 | 13.40 | 13.44 | 10.13 | 3.06 | 0.1491 | 25.46 | 1 | 1 |
| 9 | 3 | 13.40 | 14.00 | 10.06 | 3.02 | 0.1495 | 24.83 | 1 | 1 |
| 10 | 2 | 13.46 | 13.58 | 10.13 | 2.98 | 0.1474 | 24.59 | 1 | 1 |
| 11 | 4 | 13.00 | 13.20 | 9.84 | 3.98 | 0.1014 | 29.76 | Null | 2 |
| 12 | 5 | 13.05 | 13.15 | 9.88 | 4.04 | 0.1019 | 29.70 | Null | 2 |
| 13 | 6 | 13.00 | 13.20 | 10.17 | 3.94 | 0.1004 | 30.45 | Null | 2 |
| 14 | 4 | 13.20 | 13.38 | 10.01 | 4.01 | 0.1009 | 29.69 | Null | 2 |
| 15 | 5 | 13.24 | 13.40 | 9.83 | 3.93 | 0.1011 | 29.75 | Null | 2 |
| 16 | 6 | 13.20 | 13.40 | 9.93 | 4.06 | 0.0987 | 29.40 | Null | 2 |
| 17 | 4 | 13.46 | 14.00 | 9.96 | 4.04 | 0.0996 | 29.78 | Null | 2 |
| 18 | 5 | 13.40 | 13.44 | 10.14 | 4.01 | 0.0996 | 29.72 | Null | 2 |
| 19 | 6 | 13.40 | 14.00 | 9.95 | 4.01 | 0.0999 | 29.52 | Null | 2 |
| 20 | 4 | 13.46 | 13.58 | 9.89 | 3.93 | 0.1006 | 29.82 | Null | 2 |
| 21 | 7 | 13.00 | 13.20 | 9.84 | 2.49 | 0.2006 | 19.98 | Null | 3 |
| 22 | 8 | 13.05 | 13.15 | 9.99 | 2.48 | 0.2040 | 19.78 | Null | 3 |
| 23 | 9 | 13.00 | 13.20 | 9.94 | 2.47 | 0.1986 | 20.36 | Null | 3 |
| 24 | 7 | 13.20 | 13.38 | 10.01 | 2.49 | 0.1980 | 19.94 | Null | 3 |
| 25 | 8 | 13.24 | 13.40 | 9.97 | 2.50 | 0.1975 | 19.71 | Null | 3 |
| 26 | 9 | 13.20 | 13.40 | 10.11 | 2.54 | 0.2005 | 20.18 | Null | 3 |
| 27 | 7 | 13.46 | 14.00 | 9.84 | 2.49 | 0.1970 | 19.66 | Null | 3 |
| 28 | 8 | 13.40 | 13.44 | 10.13 | 2.52 | 0.2004 | 19.99 | Null | 3 |
| 29 | 9 | 13.40 | 14.00 | 9.88 | 2.48 | 0.1991 | 19.64 | Null | 3 |
| 30 | 7 | 13.46 | 13.58 | 10.11 | 2.53 | 0.2004 | 19.83 | Null | 3 |

TABLE 5

Prototypes of the performance models derived from Table 4

| Prototype Vector | Jitter | Loss | Delay |
|---|---|---|---|
| $p_1$ | 3.01 | 0.1506 | 24.82 |
| $p_2$ | 4.00 | 0.1003 | 29.76 |
| $p_3$ | 2.50 | 0.1995 | 19.90 |

TABLE 6

99% confidence intervals for the performance models derived from Table 4

| Confidence Vector | Jitter | Loss | Delay |
|---|---|---|---|
| $c_1$ | 0.0280 | 0.0015 | 0.2193 |
| $c_2$ | 0.0395 | 0.0008 | 0.2235 |
| $c_3$ | 0.0211 | 0.0017 | 0.1905 |

It is assumed that in the previous time period only one performance model was active and that it was described by the prototype vector (3.1, 0.1521, 25.15), then comparing this prototype to the three new prototypes shows that the component-wise differences to the first new prototype are 3%, 1%, and 1.3%, respectively. That means we consider the first of the three new prototypes identical to the prototype of the existing model and discard the new prototype. The other two new prototypes display component-wise differences between 18%-34% to the existing model prototype and they are also sufficiently different to each other. Therefore, they are considered new models and will be included into the model database.

The confidence vectors of all three prototypes show that the component-wise deviation from the prototypes is about 1% only. There are also at least 3 traffic flows per route which means all models are valid for all routes and the model-route mapping table is updated accordingly (see Table 3 above). Since model 1 was used on routes 1-3 for the last two hours already, route-based statistics are already present in the Table. The models for routes 4-9 are new and no route-based statistics exist yet.

The example data illustrates how three performance models can be computed with three dimensions: jitter, loss and delay. Using the same data it is possible to compute a further nine two-dimensional models (three each for the combinations of variables of jitter/loss, jitter/delay and loss/delay) and nine one-dimensional models (three each for the three single variables jitter, loss and delay). The network operator can offer performance models on any combination of any number of performance variables. In a cluster analysis interpretation, that means that the derived cluster centres can simply be projected on all lower-dimensional subspaces of the sample space, which is three-dimensional in this example, to derive cluster-centres, or prototypes, of lower dimensionality. The projection can result in some cluster-centres being identical or very close to each other in the lower-dimensional subspace and this may result in fewer prototypes in a sub-space compared to the full sample space. In this example, the three clusters are distributed as such that we also receive three separate clusters in each possible sub-space of the sample space. Using lower-dimensional performance models gives the network operator more opportunity for diversity in traffic management. One client could only be interested in low jitter, while another client may only be concerned with low packet loss. The described clustering approach can obviously be extended to any number of performance variables. Table 7 below shows all of the prototypes, including those of lower dimensions.

TABLE 7

Prototypes table completed with lower dimensional projections of the original three prototypes

| Prototype Vector | Jitter | Loss | Delay |
|---|---|---|---|
| $p_1$ | 3.01 | 0.1506 | 24.82 |
| $p_2$ | 4.00 | 0.1003 | 29.76 |
| $p_3$ | 2.50 | 0.1995 | 19.90 |
| $p_4$ | 3.01 | 0.1506 | — |
| $p_5$ | 4.00 | 0.1003 | — |
| $p_6$ | 2.50 | 0.1995 | — |
| $p_7$ | — | 0.1506 | 24.82 |
| $p_8$ | — | 0.1003 | 29.76 |
| $p_9$ | — | 0.1995 | 19.90 |
| $p_{10}$ | 3.01 | — | 24.82 |
| $p_{11}$ | 4.00 | — | 29.76 |
| $p_{12}$ | 2.50 | — | 19.90 |
| $p_{13}$ | 3.01 | — | — |
| $p_{14}$ | 4.00 | — | — |
| $p_{15}$ | 2.50 | — | — |
| $p_{16}$ | — | 0.1506 | — |
| $p_{17}$ | — | 0.1003 | — |
| $p_{18}$ | — | 0.1995 | — |
| $p_{19}$ | — | — | 24.82 |
| $p_{20}$ | — | — | 29.76 |
| $p_{21}$ | — | — | 19.90 |

The next task is to assign DSCP values to the generated prototypes. In this example, all 21 prototypes will be offered as individual DSCP values. Such values can indeed be generated sequentially or at random as long as they can be represented by the four available bits (or six if ECN is not used). Additional considerations for generating DSCP values are given below:

1) Reserve classic DiffServ DSCP values for clusters that offer the pre-defined QoS of classic DiffServ. This maintains backwards compatibility with clients that require an understanding of classic DiffServ and mark their IP packets with the pre-defined codepoints.
2) Generate DSCP values to reduce the possibility of errors, for example by generating values with maximum Hamming distance between them, that are within the acceptable range and do not correspond to classic DiffServ codepoints.
3) The generator of DSCP values can resist using values that are currently in use. This is useful if a mapping of current DSCP values to services is not done but the operator would like continuity in service flow across multiple iterations of the principal learning component. If a table of mapping between client source/destination, DSCP values, QoS features, route(s) and load distribution is maintained, then it might not be necessary to exclude values that are currently in use but instead update what the QoS features associated with those values mean in such a table.

Generating these DSCP values should be a routine matter for a person skilled in the art. The values may be generated by a software process which is executed by the network gateway, for example. The values may be determined after the completion of the principal learning component. Once the DSCP values have been determined then the repository of available QoS models will be updated. This repository may be held by the network gateway. The DSCP value itself is only a concise lookup used by both client and the network to understand the more complex QoS features that a client desires and the network provides. Therefore, the look-up functionality can be performed by any other means, including explicit signalling in advance or any other QoS management protocol.

The second task to be performed following the completion of the principal learning component is to reserve resources for the QoS models on the respective pathways that have been determined to support them and associate these 'tunnels' with the DSCP values that have been generated in the preceding step for these QoS models.

This can be done with/without explicit reservation, MPLS with/without using DS-TE in the Maximum Allocation Model (MAM) or the Russian Doll Model (RDM). A single tunnel can be associated with a single DSCP value, multiple DSCP values can be mapped onto the same tunnel or indeed the same applies for sub-pools within a tunnel and their mapping to DSCP values. In the above example, a single tunnel is created for all dynamic QoS systems (tunnel bandwidth will be the sum of all bandwidths of the QoS models that are supported on that tunnel) and sub-pools were allocated, using MAM, to individual QoS models that are supported on the same route (or link). We also associate one DSCP value to one QoS model. This means that one DSCP value can be mapped to multiple routes, each of which can be a sub-pool on a larger tunnel on a pathway (i.e. a collection of connected routers via links) that supports multiple QoS models. A single pathway will therefore only have one overall tunnel that encompasses all dynamic QoS routing, potentially leaving available bandwidth for other types of routing. Alternatively, separate tunnels can be established for every QoS model which means that a pathway can contain multiple tunnels. Each tunnel on a route is mapped to a single DSCP value with the possibility of multiple tunnels on many pathways being mapped to the same DSCP value. This denotes that multiple tunnels support the same QoS model which means that when a request arrives at the gateway with a DSCP value, the gateway has an option of more than one tunnel to which the incoming request can be assigned and/or distributed. Note that the gateway must then keep track of load distributions across multiple routes on the same QoS model as well as across different QoS models, which might be necessitated by the load balancer function described here. Note that this might result in a large number of tunnels on a single route and therefore the first approach of having a single tunnel per pathway and modifiable sub-pools within each tunnel to signify a QoS model (and therefore DSCP value) might be more suitable.

It may be necessary to use MPLS L-LSP if more than 8 Per-Hop-Behaviours (PHBs) are defined by the dynamic QoS system. Note that the mapping of DSCP values to routes is updated at the LER (Label Edge Router) in order to determine what the first hop should be for a service flow that marks its packets with a given DSCP value.

It is necessary that DSCP values are assigned to the various QoS SLAs in real-time and that the assigned DSCP values are mapped onto specific network routes that can satisfy the required SLA. Both of these aspects will now be described.

The network uses the cluster centres as the QoS SLA itself and assigns a DSCP value to this specific SLA. Evidently, each iteration of the learning algorithm could result in the mapping between a given QoS SLA and a DSCP value to change. New DSCP mappings may be created for newly discovered cluster centres, or DSCP values may be discarded if the QoS SLA associated with it is discontinued at a given time. This highlights the necessity of the network to keep the mapping repository up-to-date so that clients can choose the correct DSCP value for the desired performance. It is also possible for DSCP values currently in use for EF/AFx/DE to be reserved solely for the classic DiffServ QoS models in order to maintain backwards compatibility and to support clients that are unaware of the adaptive QoS routing capability described herein.

DSCP values for non-classic DiffServ QoS models can be chosen in a number of ways and no specific method to do so is prescribed here. There are 6 bits available in the IP header which can be set in a number of ways. The codepoint can be chosen in a manner that minimises the impact of packet transmission errors (i.e. maximising Hamming distance) or it may be chosen arbitrarily. Codepoints for QoS models that survive two or more learning iterations can be maintained for continuity and ease of management. The outcome of this step is for the system to assign DSCP values, ToS mappings or any other reference mechanism that can be used by a client to indicate to a network that it would like a certain QoS treatment for a given flow of traffic. DSCP itself is only proposed as a vehicle to carry this information from the client to the network edge router and other methods of indicating this preference are not pre-empted. The DSCP values assigned to the tunnel clusters are stored in a mapping table for real-time use, for example in the network gateway. It is also important to store the performance SLA of a specific router against this mapping information.

Consider a single iteration of the clustering/forecasting algorithm. It results in a number of self-discovered and pre-defined time-dependent QoS models represented as cluster centres. The routes are categorized against these cluster centres. There is also an associated forecast on the stability of the QoS model. In one embodiment, these discovered end-to-end routes and their supported bandwidths are reserved using MPLS-TE, or similar, to form tunnels that can be mapped to DSCP values. RSVP and its use in MPLS-TE to implement Differentiated Services is well known. The hop-by-hop list of routers for each of these routes, classified against each QoS model, is known or discovered using the routing algorithm, probing packets or existing reservation protocols and can therefore be populated directly into the Explicit Routing Object (ERO) of the RSVP message used to create the MPLS-TE tunnel. Another outcome of the learning method could be a bandwidth value associated with this QoS performance which can also be used in the RSVP PATH message. In one embodiment, each route is mapped to a single DSCP value and therefore, this CoS can also be placed in the reservation to ensure that only the specified CoS traverses the specific MPLS tunnel. It should be noted that a single link can support multiple tunnels and hold individual reservations for each of them in its outgoing interface(s).

It is also conceivable that the learning system determines a priority for this QoS model over other QoS models (either current or active from a previous iteration) to allow pre-emption of QoS of lower importance. Such a priority system can be based on prescribed network policies or determined by optimising revenue. Alternatively, QoS models created from the most recent iteration of the learning method can be set to take precedence over past models and therefore route reservations resulting from the current iteration can preempt existing reservations by default. These are merely examples of tunnel management over time and should be considered when implementing this invention.

In a more complex embodiment, end-to-end routes can also potentially be discovered to be able to support multiple QoS models. Should MPLS-TE be used to reserve tunnels, a single tunnel can be reserved with the maximum required bandwidth for all the QoS models and bandwidth sub-pools can be established from the global pool (in any manner including Maximum Allocation Model or Russian Doll Model) for each of the QoS models supported by the given route.

It is also possible that the learning algorithm prescribes a certain packet treatment, for example, scheduling, filtering, shaping, for a given CoS which can also be implemented in the routers using the reservation mechanism.

The forecasted stability of a given QoS model determines, assuming no external factors influence route performance, the duration for which a QoS model is advertised. This stability forecast also has an impact on which discovered QoS models are advertised to clients—the more stable the offering, the less change for customers and less overhead in reservation maintenance. Should tunnel establishment or alterations be considered expensive, this can be taken into account as a weighting factor in the determination of which QoS models proceed to be set up and advertised and which are filtered out as being unreliable. It will be understood that if unpredictable external factors result in deterioration of CoS performance, as evidenced by telemetry and service performance measures collected from the network, a real-time monitoring component of the intelligent system can decide to withdraw a CoS model from being advertised. Alternatively, the learning method will discover this in its next iteration and discontinue the CoS model. Evidently, the more often the learning method is triggered, the quicker service degradation on advertised QoS models can be detected. However, this must be traded off against the cost of running the learning method and the cost of change in the network.

The flexibility provided by Differentiated Services can be extended in a self-regulating manner. Therefore, whilst this example has used QoS reservation and MPLS-TE as an exemplary mechanism for QoS routing, it is possible that a network operator chooses to achieve QoS routing in a different manner with or without explicit reservation, for example by: creating an overlay network in the link layer; by changing link costs directly in the IP layer and using the native routing algorithm to discover the optimum route as the 'shortest path'; by adjusting the MPLS routing metric and using CSPF for the same task; by using a combination of RSVP/LDP/TDP or similar for reservation and label distribution; or using DS-TE or sub-pool bandwidth management and CoS priority within a single tunnel itself. Any method of mapping routes to a dynamic time-varying set of Classes of Service using data analytics and using the routes to deliver the same CoS when requested by the client (or mapping interface) in any signalling format is covered by this invention.

If tunnels already exist in this network, either pre-configured or from a previous iteration of the adaptive QoS system, subsequent iterations of the learning method can be allowed to refresh these reservations as they are, or by altering the hop-by-hop route, with or without maintaining FECs associated with the tunnel using the make-before-break mechanism inherent to MPLS.

Assuming that the network operator chooses to use such a tunnel reservation mechanism, a mapping of the established tunnel(s) to the DSCP values that were created is updated in the Forwarding Information Base (FIB) of the Label Edge Router (LER) after each learning iteration. It is conceivable that more than one tunnel or sub-pool is used to route traffic of the same DSCP value. This is likely to be the case if more than one route is clustered together in delivering a given overall QoS (i.e. two or more cluster members are associated with a given cluster centre). In this case, the multiple routes can be used for load balancing purposes—traffic can be assigned as they arrive to routes with decreasing available bandwidth or in any manner across a number of bandwidth pools. If the learning method implements more than 8 QoS models at a given time, it might be necessary to use L-LSPs to support this. Tunnel establishment and maintenance is well known and Label Switched Routers (LSRs) maintain tunnel structure in their Label Forwarding Information Base (LFIB).

It is evident that there are two parallel network processes in this system: advertising DSCP values and routing those values appropriately. The DSCP value itself is only a medium of understanding between the client and the network in this dynamic environment. The intelligence behind the system therefore influences both these aspects. It aggregates routes into QoS models, assigns DSCP values to them and maintains the mapping between the network resources and the advertised values. When the client then requests a certain treatment by specifying a given DSCP value, the network gateway can map this back to the routes that support this treatment and assign the traffic to those routes. It can be seen that the network gateway performs a collection and distribution function and acts as the intermediary between the network and end clients.

It is proposed that two features are used in pricing services for their consumption of network usage: QoS SLA requested (cluster centre value) and adherence to QoS requested (a function of distance to cluster centre). The client is charged in proportion to the QoS SLA requested. The client can also be charged if the network is able to deliver the requested SLA, whatever this might be, with a high degree of conformance i.e. performance of chosen routes exhibit low distance to cluster centre. Clients have a wide choice of QoS SLAs to choose from and also experience good conformance to what they request. This should result in a network operator making revenue from the infrastructure in a dynamic way when the network is performing adequately and predictably, as might be the case when the network is uncongested. As congestion increases, revenue per piece of infrastructure also increases.

However, when congestion results in poor performance in the network, the clustering algorithm will alter the SLAs offered to clients. This is part of the autonomous behaviour in the system to self-heal from congestion. Intuitively, this results in fewer cluster centres and/or larger distances to cluster centres. Therefore, the network has now entered a state where it offers different guarantees of performance, depending on congestion conditions. The client can continue to choose QoS SLAs if this is appropriate for the service but this might involve a compromise on how much adherence to the promised QoS the service can tolerate. The client might choose to send different traffic at this point and/or opt to take this compromise. The pricing now falls such that the client is charged less due to the drop in conformance. Nevertheless, the network still continues to make some revenue instead of losing out due to underperformance. The operator might choose to retain some routes for traffic that involves highest loss of revenue (i.e. biggest/most expensive breaches of contract) and continue making some revenue from other traffic that requires some QoS guarantee (i.e. still better than best effort) over routes which still offer this in some way. The pricing model can be more complex and take into account other features as well such as cost per bit in operation, maintenance, contractual bundles for services etc. in addition to what is proposed here. A mere by-product of our clustering mechanism is a way for the operator to quantify both QoS and service performance adherence and incorporate this into the pricing structure.

It is not anticipated that this invention pre-empts classic DiffServ but instead co-exists alongside, serving a different need. It provides clients with the flexibility to choose on a more granular basis and in real-time what CoS they would like and potentially paying more for stringent adherence to a higher CoS at the same time as paying less for other applications at different times of day which do not need this type of treatment. It allows clients to choose different QoS at different times and paying for what is actually used. On the other hand, it enables networks to benefit from good network performance in an uncongested network by offering more QoS bins with closer adherence to those cluster centres, but at the same time making some revenue when the network is underperforming due to congestion by still offering QoS in a manner that can still be sustained and adhered to (i.e. fewer bins with larger distances to the cluster centres).

The 'intelligence entity' could reside anywhere in the network including in the network gateway. We have described that each end-to-end route is profiled and clustered into performance 'bins'. As an extension, it is also possible to apply the same clustering mechanism to a subsection of an end-to-end route to allow more routing combinations overall. In such a network, there are two factors that can occur undesirably:

the number of cluster centres, i.e. QoS models offered, increase over time into an IntServ-like model the large number of source-destination pairs result in a low traffic density distributed over the large number of routes.

The number of QoS SLAs offered can be limited using a pre-defined value. In fact, our clustering algorithm ensures that this is self-regulated. As the number of cluster centres increases, the distance of each cluster member to other cluster centres decreases. Thus, clustering becomes difficult and the cluster centres start to merge again and reduce in number. In the second case, it might be necessary to aggregate traffic from the large number of source-destination pairs into fewer nodes (i.e. unidirectional traffic from 90 sources are aggregated into 3 gateways and sent to another 3 gateways on the other edge of the network which supports 90 receivers). Our dynamic QoS system can then be implemented within the scope of the 6 gateway devices and only 9 aggregated source-destination pairs (in each direction) are managed. The choice of which gateway is used for which source/destination devices could depend on a number of factors. If the QoS between the source/destination devices and the gateways cannot be regulated, the network operator can choose to minimise the number of hops in this unmonitored region and therefore map a source/destination to a gateway with the lowest number of hops from it. Alternatively, if a QoS management mechanism is provided, the gateway for a given source/destination can be chosen in a manner to achieve the overall QoS desired, depending on the performance of both source-gateway route as well as gateway-gateway routes, and gateway-destination route. We only point out the need for such aggregation in some embodiments of this invention but leave the assignment of end devices to the aggregators at the discretion of the network operator.

There are different types of cluster analysis that can be used to learn model prototypes. We use a centroid-based clustering method like k-means clustering or variations thereof such as fuzzy c-means clustering (F Höppner, et al "*Fuzzy Clustering*", Wiley, 1999). Centroid based clustering uses a fixed number of cluster centres or prototypes and determines the distance of each data vector from a training database to each prototype. The distances are then used to update each prototype vector and move it close to the centre of the group of data vectors it represents. Different types of clustering algorithms use different distance measures and different ways of assigning a data vector to a prototype. K-means uses Euclidean distance and assigns each data vector to its closest prototype. Fuzzy c-means assigns each data vector to all prototype vectors to a degree such that the membership degrees add up to 1.

Centroid based clustering algorithms need to solve the problems of assigning initial prototypes or cluster centres and determining the optimal number of cluster centres. Initial prototypes are usually picked at random from the set of training data. The optimal number of clusters can be determined by repeatedly clustering the training data with increasing number of clusters until the result does no longer improve. The quality of a clustering result can be determined by relating the intra- to the inter-cluster distances, for example.

Centroid-based clustering is only one possible way of obtaining model prototypes representing naturally occurring groups in the QoS data of data transmissions. Practitioners trained in the art will appreciate that model prototypes can also be learned by other types of clustering algorithms like distribution-based or density-based approaches or by methods known from artificial neural networks like self-organising maps (R Silipo, "Neural Networks", from M Berthold & D J Hand, "*Intelligent Data Analysis*", Springer, Berlin, 1999, pp 217-268).

It will be understood that the method of the present invention may be implemented by executing computer code on a general purpose computing apparatus. It should be understood that the structure of the general purpose computing apparatus is not critical as long as it is capable of executing the computer code which performs a method according to the present invention. Such computer code may be deployed to such a general purpose computing apparatus via download, for example via the internet, or on some physical media, for example, DVD, CD-ROM, USB memory stick, etc.

In one aspect, the present invention provides a method of operating a communications network such that the classes of service offered by a network operator will depend upon the underlying conditions in the network. A number of performance models, each of which is described by two vectors, is determined from historical network data. These performance models can be assigned to routes through the communications network, such that a request for a session can be made in accordance with the offered performance model for that route.

The invention claimed is:

1. A method of operating a communications network, the method comprising the steps of:

determining a plurality of performance models for offering, each of the performance models comprising a first vector representing the average value of one or more transmission parameters and a second vector representing the variation of the average value of the one or more transmission parameters;

for each entry in a training dataset, assigning the closest of the plurality of performance models to that entry, the training dataset comprising transmission performance data relating to a plurality of data transmissions that were carried by the communications network in a predetermined time period;

for each one of a plurality of routes through the communications network, assigning one or more of the plurality of performance models to that route based on the assignment of the performance models to entries in the training dataset; and accepting a request for a communication session using the communications network in accordance with a class of service indicated by the one or more performance models assigned to one or more of the plurality of routes through the communications network.

2. A method according to claim 1, wherein the first and second vectors are determined by performing cluster analysis on a set of data collected from a communications network.

3. A method according to claim 1, wherein the first and second vectors are pre-determined such that the vectors represent a pre-determined quality of service (QoS).

4. A method according to claim 1, wherein the second vector may comprise a confidence interval for the one or more transmission parameters.

5. A method according to claim 1, wherein the second vector may comprise a quantile from a distribution of the one or more transmission parameters.

6. A method according to claim 1, wherein each of the performance models is reviewed periodically and any performance model which is determined to be under-used is discarded.

7. A method according to claim 1, wherein a performance model is determined to be under-used if the number of network routes to which the model is assigned is less than a predetermined number.

8. A method according to claim 1, wherein each of the performance models is reviewed periodically and any model which is determined to be unreliable is discarded.

9. A method according to claim 8, wherein a performance model is determined to be unreliable if the value of the second vector indicates a variation of the average value of the one or more transmission parameters which is greater than a pre-determined value.

10. A non-transitory data carrier device comprising computer executable code for performing a method according to claim 1.

11. An apparatus comprising a computer for executing computer code such that the apparatus is at least configured to:
   determine a plurality of performance models for offering, each of the performance models comprising a first vector representing the average value of one or more transmission parameters and a second vector representing the variation of the average value of the one or more transmission parameters;
   for each entry in a training dataset, assign the closest of the plurality of performance models to that entry, the training dataset comprising transmission performance data relating to a plurality of data transmissions that were carried by the communications network in a predetermined time period;
   for each one of a plurality of routes through the communications network, assign one or more of the plurality of performance models to that route based on the assignment of the performance models to entries in the training dataset; and
   accept a request for a communication session using the communications network in accordance with a class of service indicated by the one or more performance models assigned to one or more of the plurality of routes through the communications network.

12. A communications network comprising a plurality of nodes, a plurality of communications links inter-connecting the plurality of nodes, and a network gateway, the communications network being configured to, in use, at least perform:
   determining a plurality of performance models for offering, each of the performance models comprising a first vector representing the average value of one or more transmission parameters and a second vector representing the variation of the average value of the one or more transmission parameters;
   for each entry in a training dataset, assigning the closest of the plurality of performance models to that entry, the training dataset comprising transmission performance data relating to a plurality of data transmissions that were carried by the communications network in a predetermined time period;
   for each one of a plurality of routes through the communications network, assigning one or more of the plurality of performance models to that route based on the assignment of the performance models to entries in the training dataset; and
   accepting a request for a communication session using the communications network in accordance with a class of service indicated by the one or more performance models assigned to one or more of the plurality of routes through the communications network.

* * * * *